United States Patent [19]
Melby

[11] 3,873,668
[45] Mar. 25, 1975

[54] CUPRIC, NICKELOUS AND ARGENTOUS ION-SELECTIVE CHELATING RESINS
[75] Inventor: Lester Russell Melby, Wilmington, Del.
[73] Assignee: E. I. du Pont de Nemours and Company, Wilmington, Del.
[22] Filed: Mar. 27, 1973
[21] Appl. No.: 345,314

[52] U.S. Cl............ 423/24, 75/101 BE, 260/2.2 R, 423/139
[51] Int. Cl. ...................... B01d 15/04, C08f 27/08
[58] Field of Search.................. 260/2.2 R; 423/24; 75/101 BE

[56] References Cited
UNITED STATES PATENTS
3,037,945  6/1962  Morris .................. 260/2.1
3,337,480  8/1967  Small .................... 260/2.2
3,473,921  10/1969 Schmuckler ............. 75/118

OTHER PUBLICATIONS
Goodwin et al., J. Am. Chem. Soc., 82, 5013–5023 (1960).

Primary Examiner—Melvin Goldstein

[57] ABSTRACT

A polymer-ligand comprising a high molecular weight water insoluble polymer containing certain covalently bonded ligand moieties is capable of selectively chelating cupric and/or argentous ions from aqueous solutions containing them and other metal ions. Exemplary is polystyrene containing the moiety

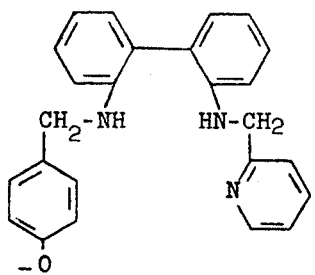

which is bound to the polymer chain through the oxygen atom.

16 Claims, No Drawings

CUPRIC, NICKELOUS AND ARGENTOUS ION-SELECTIVE CHELATING RESINS

BACKGROUND OF THE INVENTION

1. Field of the Invention

This invention provides insoluble chelating polymers which selectively bind certain metal ions in the presence of other metal ions and thus are suitable for obtaining purified concentrates from which the free metal may be recovered.

More specifically this invention provides insoluble chelating polymer systems which (1) selectively bind cupric and argentous ions in the presence of ferric, ferrous, cobaltous and nickelous ions, or (2) selectively bind cupric, argentous, and nickelous ions in the presence of ferric, ferrous and cobaltous ions. These systems are effective in obtaining purified concentrates for recovery of copper and/or silver, or copper, nickel and/or silver from low grade mine liquors.

2. Prior Art

Mine liquors from spent copper mines of the sulfide ore type contain low concentrations of cupric ($Cu^{++}$) and ferric ($Fe^{3+}$) ions, the liquors of which are acidic (pH 1–3). Conventionally, purified cupric ion solutions of commercial value are obtained from such mine liquors by liquid-liquid extraction with organo-soluble chelating agents (ligands) which are more or less selective for $Cu^{++}$ in the presence of $Fe^{3+}$ at low pH. The organic extract containing organo-soluble copper chelate is then back extracted (stripped) with strong mineral acid, e.g., 15% sulfuric acid, the acidic extract is then electrolyzed to obtain copper metal and the regenerated organic solvent-ligand solution is recycled to the liquor extraction step. High selectivity for $Cu^{++}$ over $Fe^{3+}$ is necessary because the presence of excessive amounts of $Fe^{3+}$ interferes with the electrolytic recovery (electro-winning) process.

It is well known that a solid-liquid extraction system affords several inherent mechanical advantages over liquid-liquid extraction systems such as elimination or simplification of such steps as mixing, settling, separation and recycling of solvents.

H. A. Goodwin and F. Lions, J. Amer. Chem. Soc. 82, 5013 (1960) discuss the preparation of various metal chelating compounds. They show that 2,2'-bis-(2''-pyridylmethylamino)biphenyl is able to chelate copper ions. No mention is made of a polymer containing chelating moieties nor the chelating selectivity as to copper and silver.

SUMMARY OF THE INVENTION

The invention comprises a high molecular weight water insoluble polymer containing about 0.3 to about 2 millimoles of a covalently bonded ligand per gram of polymer, the ligand having the formula

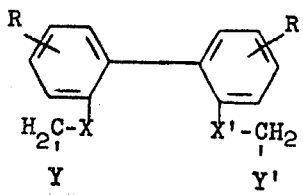

wherein
R is H or alkyl of 1–3 carbon atoms;

X and X' independently are NH, O, or S;

Y is 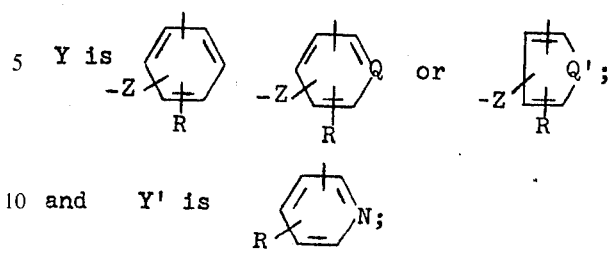

in which
Z is —O—, —S—, —S($CH_2$)$_n$, —O($CH_2$)$_n$—, —NH—, or —NH($CH_2$)$_n$— where $n = 1$ to 10;
Q is N; and
Q' is NH, O, or S;
with the proviso that at least three of X, X', Q and Q' are nitrogen;
the said ligand being attached to the methylene carbon by the indicated valence bond and being attached to the polymer through the Z group.

Preferred ligands are those where the indicated valence bond is in the ortho position relative to the ring nitrogen or the Q or Q' atom. Also preferred are those ligands in which each of X and X' is a nitrogen atom.

The polymer component of the invention has a high molecular weight, is insoluble in water and is stable to sulfuric acid of 1–25% concentration. It is preferred that the polymer also be insoluble in the organic solvents which may be used in the process of binding the polymer to the ligands. The polymer can be in any of various forms since it acts merely as a base or support for the chelating ligands. Thus the polymer may be used as beads or other small particles having a large surface area or may be in the form of a continuous belt as described below.

Useful polymers include polyvinyl chloride, polyvinylidene chloride, and chloro-, bromo-, or iodomethylated polystyrene, etc. The preferred polymer used in making the polymer-ligand is chloromethylated polystyrene. Typically, such a polymer is made insoluble by cross-linking styrene with divinylbenzene. The degree of cross-linking may vary from 0.5–8% by weight of divinylbenzene and the polymers may exist as beads or pulverized solid. Such polymers are prepared and chloromethylated by any of a variety of means known and described in the prior art, as for example, U.S. Pat. Nos. 2,614,099 and 2,629,710.

The polymer may be prepared also by radiation grafting styrene to an inert polymer such as polyethylene or polypropylene in the form of a particulate solid or continuous material, such as woven fabric, bundled fibers, or as spunbonded felted material such as Tyvek, a spun bonded polyolefin. The continuous materials may be in the form of an endless belt. Such styrene-grafted materials are then chloromethylated prior to ligand attachment.

The ligand component of the invention is a biphenyl compound of the general formula above having a hydroxy, thiol, thioloalkyl (HS—($CH_2$)$_n$—), hydroxyalkyl (HO—($CH_2$)$_n$), amino ($NH_2$), or aminoalkyl ($NH_2$—($CH_2$)$_n$—), and the like if the ligand is to be attached to a preformed polymer by nucleophilic substitution. Such groups can be on any one of the four aromatic nuclei comprising the essential ligand structure.

The ligands are reacted with a polymer having reactive groups such as chlorine, bromine, or iodine, etc., through a condensation reaction to split out halogen acid, etc. Where the ligand contains a polymerizable vinyl group, it may be connected to the polymer by a copolymerization reaction. As an illustration, a ligand containing a OH group can be attached by condensation with the chloromethylated polymer in the presence of a strong base such as an alkali metal alkoxide, alkali metal hydroxide or carbonate, quaternary ammonium hydroxide, or a tertiary amine in an inert solvent, such as dimethylformamide, dimethylacetamide, dimethylsulfoxide, hexamethylphosphoramide or dioxane at temperatures ranging from ambient to about 100°C. in the presence or absence of one molar equivalent of water.

SPECIFIC EMBODIMENTS OF THE INVENTION

The following are illustrative examples of the invention in which all parts are by weight unless stated otherwise.

EXAMPLE 1

Ligand
N-(p-Hydroxyphenylmethyl)-N'-(2-pyridylmethyl)-2,2'-diaminobiphenyl(1)

A. The precursor for this ligand is prepared as follows:

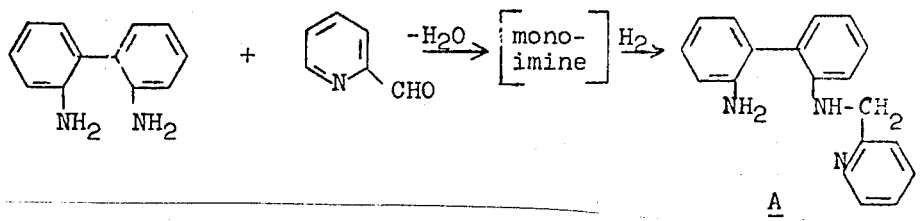

To a stirred, refluxing solution of 9.2 g (50 moles) of 2,2'-diaminobiphenyl in 200 ml of ethanol was added dropwise during 2 hours a solution of 5.3 g (50 moles) of pyridine-2-aldehyde (redistilled, bp 70°C., 15 mm) in 100 ml of ethanol. When addition was complete, the mixture was refluxed for an additional 30 minutes and was then cooled to room temperature. Three grams of sodium borohydride was added and the solution was stirred overnight (16-20 hours). Another 3 g of sodium borohydride was added and stirring continued for 24 hours more. The solution was transferred to a large Erlenmeyer flask and boiled to virtual dryness on a steam bath. Approximately 500 ml of water and 300 ml of ether were added and the mixture was stirred until both layers were clear. The ether was separated, washed with 100 ml of water, dried briefly with sodium sulfate and evaporated to 50 ml on a steam bath. It was cooled to room temperature and magnetically stirred overnight. N-(2-pyridylmethyl)-2,2'-diaminophenyl (A) separated as a finely divided crystalline white product. The mixture was stored at −10°C. overnight and the product was collected and washed with a small amount of cold ether; the yield was 9.2 g (67%), mp 85°-95°C. Another 2.0 g was obtained from the concentrated mother liquor (total yield, 82%). This material was then recrystallized from benzenehexane giving a material having a melting point of 93°-94°C.

Anal. Calcd. for $C_{18}H_{17}N_3$ (mol. wt. 275.3):
C, 78.5; H, 6.2; N, 15.3.
Found: C, 78.2; H, 6.3; N, 15.0.

The reaction produces an interim monoimine which is reduced to form the desired starting material. The reaction is carried out near or in the presence of a solvent such as an alkanol of 1-4 carbon atoms (methanol, ethanol, propanol, etc.), benzene or alkyl benzene (toluene, xylene, etc.).

The reaction temperature is usually maintained at 80°-90°C. or at the boiling point of the solvent chosen. If no solvent is employed, a temperature of 80°-100°C. is preferred. In any case, the amine aldehyde mixture must be in a liquid state. The reaction may occur spontaneously when the reactants are mixed.

Reduction of the monoimine to the corresponding amine is accomplished by using any of a number of reducing agents such as sodium borohydride in lower alkanols, sodium metal in lower alkanols, lithium aluminum hydride in ether or tetrahydrofuran, or catalytically with hydrogen gas at atmospheric or superatmospheric pressure and temperatures from 20°C. to 100°C. in inert solvents over typical hydrogenation catalysts such as nickel, platinum or palladium.

B. Precursor A is used in the following reaction to produce ligand (1):

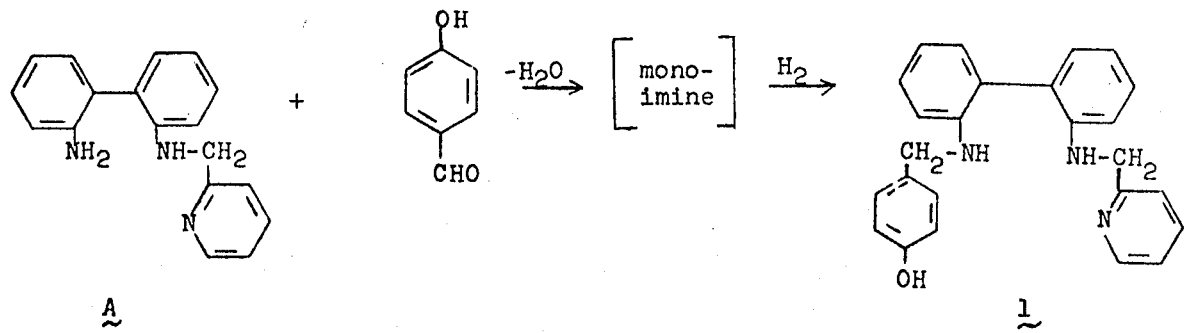

Solutions of 8.0 g (29 mmoles) of N-(2-pyridylmethyl)-2,2'-diaminobiphenyl (A) and 3.54 g (20 mmoles) of p-hydroxybenzaldehyde, each in 40 ml of ethanol were mixed and boiled gently for 0.5 hour, cooled to room temperature and made up to 100 ml volume with fresh ethanol. Two grams of sodium borohydride was added and the mixture stirred at room temperature for 5 hours. Another 2 g of sodium borohydride was added and stirred for an additional 16 hours. The solution was boiled to dryness on a steam bath and the residue treated with 400 ml of water. A thick syrup separated and the water was decanted. The syrup was washed by decantation with water and was taken up in 200 ml of ether. The ether solution was dried with sodium sulfate, filtered, and concentrated to 50 ml volume. On standing at room temperature overnight, the solution deposited about 5 g of N-(p-hydroxyphenylmethyl)-N'-(2-pyridylmethyl)-2,2'-diaminobiphenyl (1) as a white crystalline solid. It was recrystallized from 98% alcohol, the solution was chilled at −15° to −20°C. overnight and the crystals of ligand monohydrate were collected and dried in a stream of moist air, mp, 116°–118°C.

This monohydrate was heated at 80°C. in a vacuum to obtain the anhydrous form, mp, 132°–135°C.

Anal. Calcd. for $C_{25}H_{23}N_3O$: C, 78.7; H, 6.0; N, 11.0.
Found: C, 78.7; H, 6.3; N, 11.2.

EXAMPLE 2

Ligand
N-(3-Hydroxy-2-pyridylmethyl)-N'-(2-pyridylmethyl)-2,2'-diaminobiphenyl (2)

crystals. The imine compound was recrystallized from ethanol, mp, 148°–150°C. Recrystallized imine (2.4 g) and 1 g of sodium borohydride in 280 ml of ethanol was stirred at room temperature for 16 hours and then evaporated to dryness. The residue was taken up in a mixture of 300 ml of water and 150 ml of ether and the mixture was stirred until clear. The ether layer was separated, dried over anhydrous sodium sulfate and concentrated to 20 ml volume, then chilled to obtain 0.9 g of N-(3-hydroxy-2-pyridylmethyl)-N'-(2-pyridylmethyl)-2,2'-diaminobiphenyl (2) as white crystals. The water layer was buffered to pH 8 with sodium bicarbonate to obtain a second crop, weighing 0.5 g. The combined crops were recrystallized from 66% aqueous ethanol to obtain white crystals, mp, 181°–183°C.

Anal. Calcd. for $C_{24}H_{22}N_4O$: C, 75.4; H, 5.3; N, 14.7.
Found: C, 75.9; H, 6.0; N, 14.5.

Ligands 1 and 2 are presently preferred. Their donor atoms, which are responsible for coordinating the metal ion in metal scavenging processes, are all nitrogen atoms. In tetradentate ligand 2, one of the donor atoms may be replaced by an oxygen or sulfur atom. In all cases, two of the donor atoms must be attached directly to the 2- and 2'- positions of the biphenyl nucleus. Ligand 1 is selective for cuprous and argentous ions in the presence of ferric, ferrous, cobaltous and nickelous ions and the ligand 2 moiety is selective for cuprous, argentous and nickelous ions in the presence of ferric, ferrous and cobaltous ions.

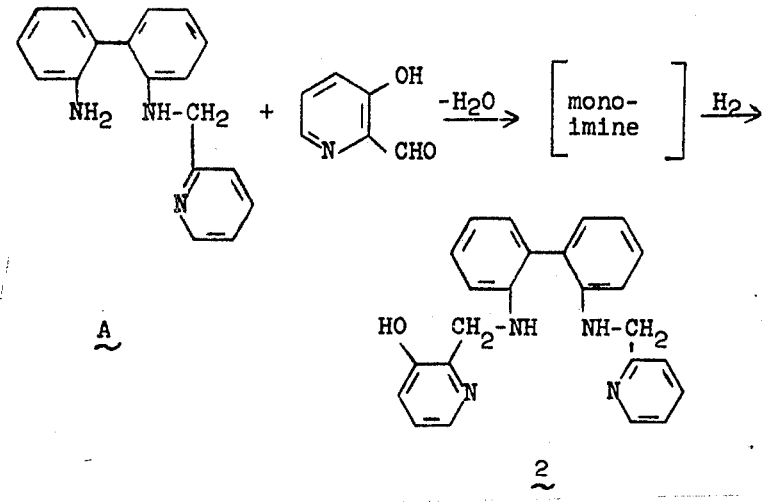

Commercially available 3-hydroxy-2-hydroxymethylpyridine hydrochloride was converted to the free base with sodium bicarbonate. The base was oxidized to the aldehyde with manganese dioxide in refluxing benzene in a manner known to the art. The aldehyde hydrochloride was isolated by passing dry HCl into the filtered benzene solution.

A mixture of 4.3 g (15.5 mmoles) of N-(2-pyridylmethyl)-2,2'-diaminobiphenyl (A) and 2.5 g (15.5 mmoles) of the above hydroxypyridine aldehyde hydrochloride in 100 ml of ethanol was boiled gently on steam for 15 minutes and the solution was then chilled at −15° to −20°C for 2 days to obtain 1.7 g of yellow

EXAMPLE 3

N-(2-Hydroxybenzylidene)-N'-(2-pyridylmethyl)-2,2'-diaminobiphenyl (3)

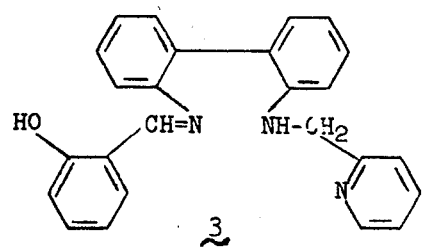

A solution of 2.75 g of N-(2-pyridylmethyl)-2,2'-diaminobiphenyl (A) and 1.22 g of salicylaldehyde in 25 ml. of ethanol was vigorously boiled on a steam bath until the volume was 10 ml. It was chilled at −20°C. overnight to obtain the crude orange-yellow crystalline imine 3; yield 3.4 g (90%), mp 106°–110°C.

For analysis a small portion was recrystallized from ethanol, mp 108°–112°C.

Anal. Calcd for $C_{25}H_{21}N_3O$ (MW 379.4): C, 79.2; H, 5.5; N, 11.1.
Found: C, 79.4; H, 5.7; N, 11.3.

NMR (CDCl$_3$) δ 8.42 (S, 1, =CH—), 8.2–8.39 (m, 1, pyridine α), 6.4–7.4 (m, 15 aromatic and pyridine β, γ), 4.35 (S, 3, —CH$_2$— and NH).

EXAMPLE 4

N-(2-Hydroxybenzyl)-N'-(2-pyridylmethyl)-2,2'-diaminobiphenyl (4)

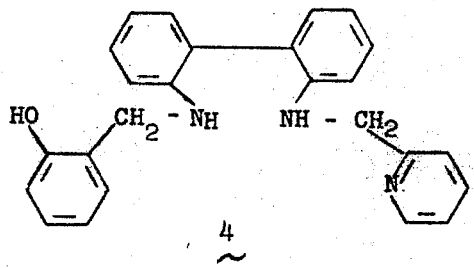

To a suspension of 15 g of crude imine 3 in 375 ml ethanol was added 2.25 g of sodium borohydride and the mixture was stirred at room temperature for two days. The first crop of crystalline solid 4 was collected and washed with cold ethanol and then with water; yield 6.5 g, mp 156–158°C. The filtrate was evaporated to remove the ethanol and the second crop of solid was collected and recrystallized from 200 ml of ethanol to obtain an additional 5.5 g of product, mp 154°–156°C. The total yield was 80%.

Anal. Calcd for
$C_{25}H_{23}N_3O$ (MW 381.4): C, 78.8; H, 6.1; N, 11.0.
Found: C, 78.9; H, 6.2; N, 11.0.

EXAMPLE 5

N-(3-Hydroxybenzylidene)-N'-(2-pyridylmethyl)-2,2'-diaminobiphenyl) (5)

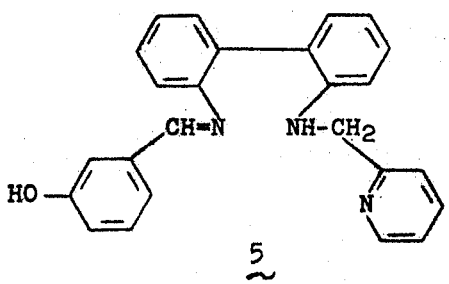

The reaction of 3-hydroxybenzaldehyde and pyridylmethyldiaminobiphenyl was carried out as described for ligand 4, the 2-hydroxy isomer, to obtain the imine 5 as slightly yellow matted needles; yield 2.7 g, mp 69°–72°C. The air-dried product was the hemialcoholate.

Anal. Calcd for $C_{25}H_{21}N_3O\cdot1/2C_2H_5OH$ (MW 402.5):
C, 77.5; H, 6.9; N, 10.4.
Found: C, 77.2; H, 6.3; N, 10.4.

EXAMPLE 6

N-(3-Hydroxybenzyl)-N'-(2-pyridylmethyl)-2,2'-diaminobiphenyl (6)

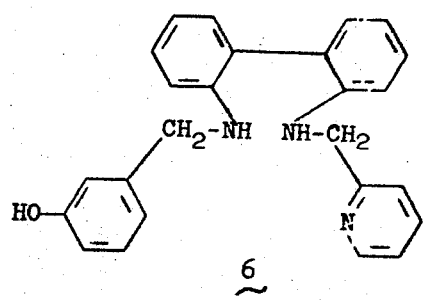

The 3-hydroxy imine 5 was reduced as described for the 2-hydroxy compound. The crude mixture was evaporated to dryness, the residue triturated with water and solid 6 collected. It was recrystallized from ethanol (∼ 10 ml/g) to obtain purified product in 66% yield, mp 148°–150°C.

Anal. Calcd for $C_{25}H_{23}N_3O$ (MW 381.4):
C, 78.8; H, 6.1; N, 11.0.
Found: C, 78.6; H, 6.3; N, 11.1.

EXAMPLE 7

A. N-(6-Methyl-2-pyridylmethyl)-2,2'-diaminobiphenyl (7)

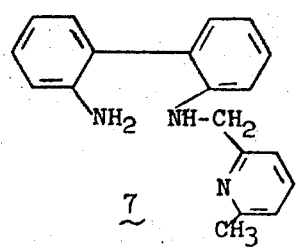

The reaction of 2,2'-diaminobiphenyl with one molar equivalent of 6-methylpyridine-2-aldehyde and reduction of the intermediate imine with sodium borohydride was carried out as described for the unmethylated analog (Example 1). Since the product did not crystallize, it was used as a crude sirup obtained by evaporating the ether extract to dryness.

B. N-(3-Hydroxy-2-pyridylmethylene)-N'-(6-methyl-2-pyridylmethyl)-2,2'-diaminobiphenyl (8)

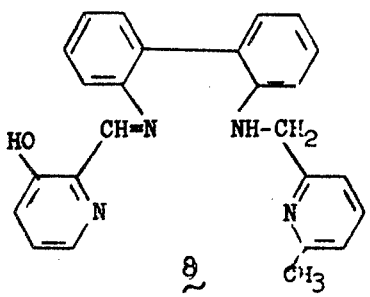

To a solution of 22 g of compound 7 in 100 ml of ethanol was added a separate solution of 6.0 g of 3-hydroxypyridine 2-aldehyde hydrochloride in 100 ml of ethanol and 5.25 ml of triethylamine was added immediately. The mixture was gently boiled on a steam bath for 5 min. then stored overnight at −20°C. The yellow crystalline product 8 was collected on a filter, washed with a small amount of ethanol, then with water, and air dried. The crude yield was 11.8 g (80% based on aldehyde) and the mp 140°–142°C. It was recrystallized from ethanol (30 ml/g, Darco) to obtain 8.5 g mp 148°–151°C.

Anal. Calcd for $C_{25}H_{22}N_4O$ (MW 394.5):
C, 76.1; H, 5.6; N, 14.2.
Found: C, 76.4; H, 5.7; N, 14.2.

NMR (CDCl$_3$) δ 12.5 (broad, —OH), 8.74 (S, 1=CH—), 8.0–8.15 (m, 1, pyridine α), 6.5–7.5 (m, 13, aromatic and pyridine β, γ), 4.7 (broad, NH), 4.2–4.5 (m, 2, —CH$_2$—) 2.35 (S, 3, —CH$_3$).

EXAMPLE 8

N-(3-Hydroxy-2-pyridylmethyl)-N'-(6-methyl-2-pyridylmethyl)-2,2'-diaminobiphenyl (9)

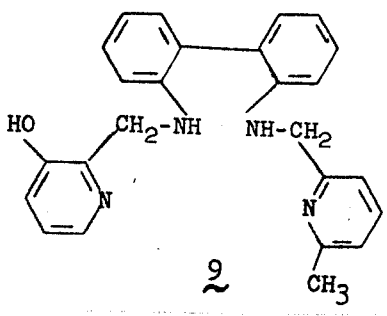

To a suspension of 6.0 g of compound 8 in 180 ml of ethanol was added 0.9 g of sodium borohydride and the mixture was vigorously stirred at room temperature until the yellow solid had dissolved and decolorized (∼ 30 min). The solution was evaporated to dryness, taken up in 200 ml of water and acidified with acetic acid. The white solid 9 was collected and recrystallized from ethanol (4 ml/g); yield 4.6 g (76%), mp 160°–162°C.

Anal. Calcd for $C_{25}H_{24}N_4O$ (MW 396.5):
C, 75.7; H, 6.1; N, 14.1.
Found: C, 75.7; H, 6.3; N, 14.2.

EXAMPLE 9

A. 3-Hydroxy-6-methylpyridine-2-aldehyde Hydrochloride (10)

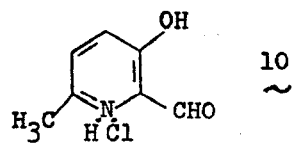

Into a 2-l, one-neck flask was placed 1 liter of benzene and 20 g of commercially available 2-hydroxymethyl-3-hydroxy-6-methyl pyridine. With continuous magnetic stirring 100 g of finely-divided, activated manganese dioxide (Shepherd Chemical Co.) was added in portions to ensure uniform suspension. The flask was equipped with a Soxhlet extractor head with a cup capacity of about 75 ml, the cup containing 20 g of 4 A molecular sieves. The mixture was heated under reflux for 5 hrs., cooled to room temperature, the benzene suspension filtered and the filter cake washed with 200 ml of benzene. The filtrate was saturated with dry hydrogen chloride, the precipitated hydrochloride 10 collected, washed with benzene and dried. It was vacuum sublimed at 130°–140°C., 1–2 mm pressure; yields 12–16 g (50–65%); mp 215°–217°C. (dec).

Anal. Calcd for $C_7H_8ClNO_2$ (MW) 173.6): C, 48.4; H, 4.7; N, 8.1.
Found: C, 48.1; H, 4.5; N, 8.0.

B.
N-(3-Hydroxy-6-methyl-2-pyridylmethylene)-N'-(2-pyridylmethyl)-2,2'-diaminobiphenyl (11)

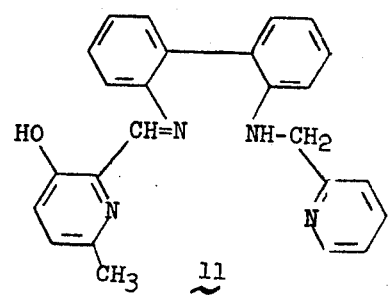

In 50 ml of ethanol was dissolved 15.0 g of N-(2-pyridylmethyl)-2,2'-diaminobiphenyl (from Example 1) by warming gently on a steam bath. To it was added a solution of 9.5 g of aldehyde hydrochloride 10 immediately followed by 3.3 g of sodium methoxide. The mixture was heated on a steam bath for 30 mins then stored at −20°C. overnight. The solid was collected, washed with a small amount of cold ethanol then with water to dissolve by-product NaCl, and dried. The yield of analytically pure product 11 was 18.2 g (85%), mp 148°–151°C.

Anal. Calcd for $C_{25}H_{22}N_4O$ (MW 394.5):
C, 76.1; H, 5.6; N, 14.2.
Found: C, 76.5; H, 5.7; N, 14.0.

NMR (CDCl$_3$) δ 12.2 (—OH), 8.80 (S, 1 =CH—) 8.3–8.5 (m, 1, pyridine α), 6.5–7.5 (m, 13, aromatic and pyridine β, γ), 4.40 (broad S, 3, NH and CH$_2$—), 2.42 (S, 3, CH$_3$).

EXAMPLE 10

N-(3-Hydroxy-6-methyl-2-pyridylmethyl)-N'-(2-pyridylmethyl)-2,2'-diaminobiphenyl (12)

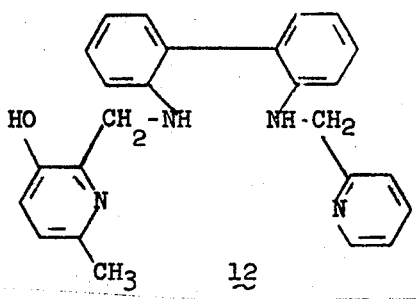

To a suspension of 15 g of imine 11 in 200 ml of ethanol was added 1.5 g of sodium borohydride and the mixture was stirred at room temperature overnight. It was evaporated to dryness, the residue slurried with 200 ml of water and acidified to pH 6 with acetic acid. The white solid was collected, washed with water, dried and recrystallized from ethanol (20 ml/g) to obtain 10.3 g (67% yield) of crystalline product 12, mp 170°–172°C.

Anal. Calcd for $C_{25}H_{24}N_4O$ (MW 396.5):
C, 75.7; H, 6.1; N, 14.1.
Found: C, 75.7; H, 6.1; N, 14.0.

EXAMPLE 11

A.
N-(2-Pyridylmethyl)-2,2'-diamino-6,6'-dimethylbiphenyl (13)

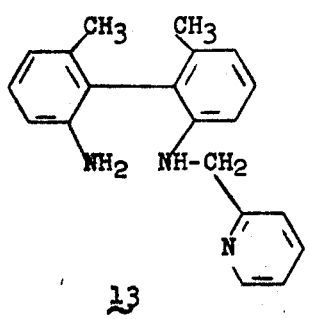

2-Iodo-3-nitrotoluene was prepared by a known method. The crude product was recrystallized from hexane (10 ml/g, Darco) to obtain 80–85% yields of purified material, mp 62°–64°C. Coupling of the iodo compound was carried out by heating a mixture of the iodo compound with 50% of its weight of copper bronze (United States Bronze Powders, Inc., Copper Bronze Natural, Copper Fine, type 44) and an equal weight of sand at 175°–180° for 1 hour. Benzene extraction and recrystallization of the crude product from ethanol gave purified 2,2'-dinitro-6,6'-dimethylbiphenyl in 70% yields, mp 106°–107°C.

Hydrogenation of the dinitro compound in ethyl acetate (10 ml/g) with Raney nickel catalyst and hydrogen at 8 atm and room temperature for 4–5 hrs gave the diamine in 85% yields after recrystallization from ethanol (3ml/g), mp 134°–136°C.

Reaction of 2,2'-diamino-6,6'-dimethylbiphenyl with 1 mole of pyridine-2-aldehyde followed by reduction with sodium borohydride as described previously (Examples 1 and 7) gave compound 13 as a crude sirup.

B.
N-(3-Hydroxy-6-methyl-2-pyridylmethylene)-N'-(2-pyridylmethyl)-2,2'-diamino-6,6'-dimethylbiphenyl (14)

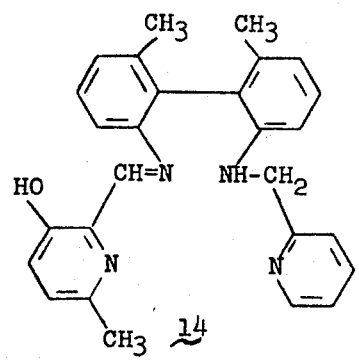

To a solution of 9 g of sirupy 13 in 50 ml of ethanol was added a solution of 5.2 g of the aldehyde hydrochloride 10 in 50 ml of ethanol. Sodium methoxide (1.62 g) was added and the mixture was boiled gently for 30 mins then chilled at −20° overnight. The crude product 14 was collected, washed with ethanol and water and dried. The crude yield was 4.8 g (38%). It was recrystallized from ethanol (5 ml/g) to recover 3.0 g (24% yield), mp 153°–156°C.

Anal. Calcd for $C_{27}H_{26}N_4O$ (MW 422.5):
C, 76.8; H, 6.2; N, 13.3.
Found: C, 76.7; H, 6.1; N, 13.1.

NMR (CDCl$_3$) δ 12.9 (S, 1, OH), 8.79 (S, 1, =CH—), 8.27–8.47 (m, pyridine α), 7.5–6.4 (m, 11, aromatic and pyridine β, γ), 4.27–4.47(m, 2, —CH$_2$—), 3.97–4.45 (m, —NH—), 2.44 (s, 3, phenyl—CH$_3$), 1.86 s, 3, phenyl—CH$_3$).

EXAMPLE 12

N-(3-Hydroxy-6-methyl-2-pyridylmethyl)-N'-(2-pyridylmethyl)-2,2'-diamino-6,6'-dimethylbiphenyl (15)

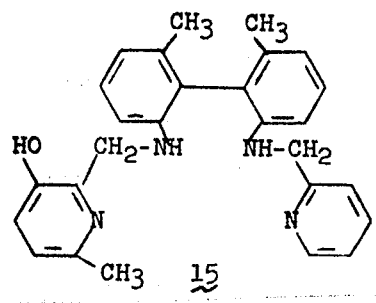

A filtered solution of 2 g of sodium borohydride in 100 ml of ethanol was added to a stirred suspension of 8.2 g of imine 14 in 100 ml of ethanol. Stirring was continued for 4 hrs and the first crop of white product 15 was collected, yield 4.75 g, mp 192°–195°C. The filtrate was evaporated to dryness and the residue was slurried with water to obtain a second crop of crude solid (3.04 g) which was recrystallized from ethanol to recover 2.4 g of purified product, mp 192°–195°C.

A portion of the first crop was recrystallized from ethanol for analysis, mp 194°–195°C.

Anal. Calcd for $C_{27}H_{28}N_4O$ (MW 424.5): C, 76.5; H, 6.65; N, 13.2.
Found: C, 76.5; H, 7.0; N, 13.3.

EXAMPLE 13

A.

N-(3-Hydroxy-2-pyridylmethylene)-N'-(2-pyridylmethyl)-2,2'-diamino-6,6'-dimethylbiphenyl (16)

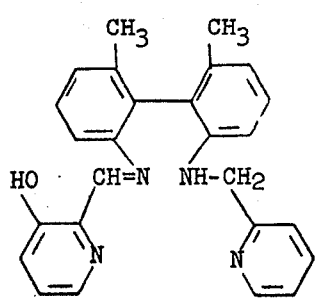

16

To 13 g of amine 13 (Example 11) in 200 ml of ethanol was added a solution of 6.9 g of 3-hydroxypyridine-2-aldehyde hydrochloride in 100 ml of ethanol followed immediately by 2.3 g of sodium methoxide. The mixture was boiled on a steam bath for 30 mins., cooled to room temperature, filtered, and the filtrate concentrated to 50 ml volume. The solution was chilled at −10° to −20°C. for 2 days and the yellow crystalline product 16 was collected and recrystallized from ethanol to obtain 5.2 g of purified material, m.p. 140°–142°C. For analysis a small portion was again recrystallized.

Anal. Calcd for $C_{26}H_{24}N_4O$ (MW 408.5): N, 13.7.
Found: N, 13.7.

NMR (CDCl$_3$) δ 12.4 (s, 1, OH), 8.99 (s, 1, =CH—), 8.6–8.4 (m, 1, pyridine α), 8.28 (t, 1, J = 3, pyridine α), 7.5–6.5 (m, 11, aromatic), 4.51 (s, 1, —NH—), 4.44 (s, 2, —CH$_2$—), 2.16 (s, 3, —CH$_3$), 1.94 (s, 3, —CH$_3$).

B.

N-(3-Hydroxypyridylmethyl)-N'-(2-pyridylmethyl)-2,2'-diamino-6,6'-dimethylbiphenyl (17)

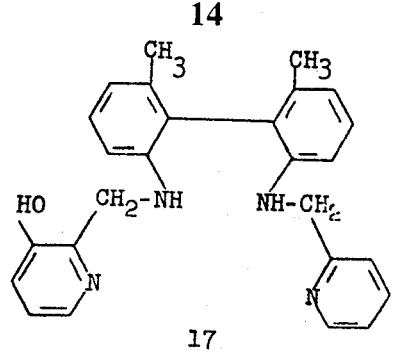

17

To a stirred suspension of 5.0 g of imine 16 in 150 ml of ethanol was added 1.0 g of sodium borohydride and the mixture was stirred overnight at room temperature. It was evaporated to dryness and stirred with 200 ml of water on a steam bath, cooled and the crude solid collected and recrystallized from ethanol to obtain 1.8 g of purified product 17, m.p. 170°–173°. The original aqueous filtrate was acidified with acetic acid, neutralized with sodium bicarbonate and the solid collected and recrystallized to obtain a second crop, 0.4 g, m.p. 172°–174°C.

Anal. Calcd for $C_{26}H_{26}N_4O$ (MW 410.5): C, 76.1; H, 6.4; N, 13.7.
Found: C, 75.9; H, 6.9; N, 13.4.

EXAMPLE 14

A.

N-(3-Hydroxy-6-methyl-2-pyridylmethylene)-N'-(6-methyl-2-pyridylmethyl)-2,2'-diaminobiphenyl (18)

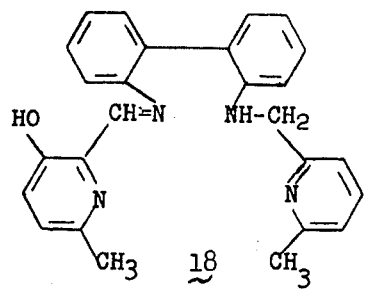

18

To a solution of 11 g of a sirupy compound 7 (Example 7) in 75 ml of ethanol was added a solution of 3-hydroxy-6-methylpyridine-2-aldehyde hydrochloride 10 and 1.85 g of sodium methoxide. The mixture was heated on a steam bath for 30 min., concentrated to 50 ml volume, filtered and the filtrate chilled overnight at −10° to −20°C. The yellow solid 18 was collected, washed with water and recrystallized from ethanol to obtain 5.0 g (36%) of yellow needles, m.p. 59°–62°. Recrystallized again from EtOH the m.p. was 64°C.

Anal. Calcd for $C_{26}H_{24}N_4O$ (MW 408.5): C, 76.4; H, 5.9; N, 13.7.
Found: C, 76.7; H, 6.1; N, 13.6.

NMR (CDCl$_3$) δ 12.2 (s, OH), 8.83 (s, =CH—), 7.5–6.5 (m, aromatic), 4.41 (broad s, —CH$_2$—NH—), 2.46 (s, CH$_3$), 2.40 (s, CH$_3$).

B.
N-(3-Hydroxy-6-methyl-2-pyridylmethyl)-N'-(6-methyl-2-pyridylmethyl)-2,2'-diaminobiphenyl (19)

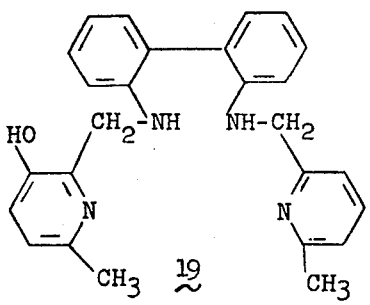

To a solution of 10 g of the imine 18 in 200 ml of ethanol was added 1.5 g of sodium borohydride and the solution was stirred at room temperature overnight. It was evaporated to dryness, treated with 200 ml of saturated aqueous sodium bicarbonate and the resulting semi-solid mass was isolated and dissolved in 35 ml of ethanol and filtered. The filtrate was chilled at −10° to −20°C. overnight and the resulting white crystalline solid 19 was collected and dried; yield, 7.7 g, m.p. 93°–99°C., unchanged on further recrystallization.

Anal. Calcd for $C_{26}H_{26}N_4O$ (MW 410.5): N, 13.7.
Found: N, 13.7.

EXAMPLE 15

A.
N-(6-Methyl-2-pyridylmethyl)-2,2'-diamino-6,6'-dimethylbiphenyl (20)

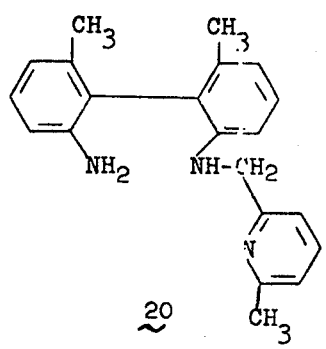

The reaction of 2,2'-diamino-6,6'-dimethylbiphenyl with 6-methyl-pyridine-2-aldehyde and reduction with sodium borohydride was carried out in the way previously described (Examples 1, 7 and 11) to obtain the amine 20 as a sirup.

B.
N-(3-Hydroxy-6-methyl-2-pyridylmethyl)-N'-(6-methyl-2-pyridylmethyl)-2,2'-diamino-6,6'-dimethylbiphenyl Trihydrochloride (21)

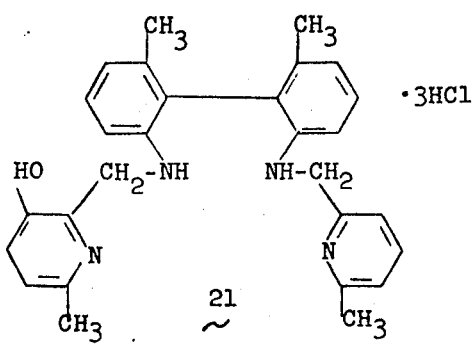

To a solution of 15 g sirupy compound (20) in 50 ml of ethanol was added a solution of 5.2 g of the methylhydroxypyridine aldehyde 10 in 50 ml of ethanol, and 1.62 g of sodium methoxide was added. The mixture was heated on a steam bath for 30 mins., filtered free of NaCl, cooled to room temperature, and stirred overnight with 2 g of sodium borohydride. The mixture was evaporated to dryness, dissolved in 50 ml of hot 3 N HCl, treated with Darco, filtered and chilled overnight to obtain the product 21 as fine, yellowish needles, m.p. 164°–170°C. (dec.).

Anal. Calcd for $C_{28}H_{35}Cl_3N_4O$ (MW 548): C, 61.3; H, 6.1; N, 10.2.
Found: C, 61.0; H, 6.3; N, 10.3.

Examples of operable ligands in which one of the donor nitrogen atoms has been replaced by O or S in a tetradentate ligand analogous to ligand 2 are:

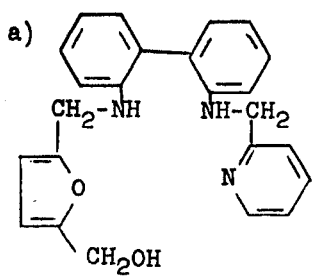

N-(5-hydroxymethyl-2-furyl methyl)-N'-(2-pyridylmethyl)-2,2-'-diaminobiphenyl b) 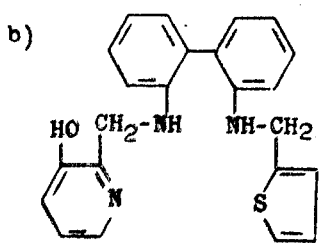

N-(3-hydroxy-2-pyridylmethyl)-
N'-(2-thienylmethyl)-
2,2'-diaminobiphenyl

These compounds may be prepared by stepwise condensation of 1 mole of the appropriate aldehyde with one mole of 2,2'-diaminodiphenyl followed by reduction of the intermediate imine to the corresponding amine. Condensation with a mole of a second aldehyde and subsequent reduction results in the desired product.

EXAMPLE 16

Crosslinked Polystyrene With Ligand 1

A. Polystyrene beads, 200–400 mesh, crosslinked with 2% divinylbenzene, were chloromethylated according to known methods. In the procedure 50 g of crosslinked polystyrene beads was allowed to swell in 200 g of chloromethyl methyl ether for 1 hour at room temperature. A mixture of 7 ml of anhydrous stannic chloride in 100 ml of chloromethyl methyl ether was added and the mixture stirred and boiled under reflux for 1 hour. The beads were collected on a filter and washed successively with dioxane-water, dioxane-conc. hydrochloric acid, dioxane and finally, methanol or ethanol. After vacuum drying the product contained 21% chlorine.

A mixture of 2.26 g of ligand (1) in monohydrate form and 0.32 g of sodium methoxide in 20 ml of anhydrous freshly distilled dimethylformamide (DMF) was stirred under nitrogen at room temperature for 10 minutes and then 1.0 g of the chloromethylated polystyrene was added. The mixture was stirred and heated at 85°–90°C. for 16 hours.

The product was collected on a course frit filter and washed successively with 20 ml-portions of DMF containing 10, 20, 50 and 75% water (v/v) by volume, then with 20 ml of DMF and then successively with 20 ml-portions of DMF containing 10, 20, 50 and 75% ethanol (v/v); then, finally, with ethanol alone. The product was vacuum-dried at 90°C. for 18 hours, yielding 2.25 g. Analysis: Found: N, 6.7%, 6.5%, corresponding to 1.57 millimoles of ligand per gram of polymer.

B. A two-fold scale reaction analogous to part A above was carried out to obtain 5.14 g of the product. Analysis: Found: 7.6% N, corresponding to 1.81 mmoles of ligand per gram of polymer.

C. A preparation analogous to the one described in part B above was carried out using one molar equivalent of anhydrous ligand (1) instead of the monohydrate. The yield was 5.23 g and the product contained 7.5% nitrogen corresponding to 1.79 mmoles of ligand per gram of polymer. This polymer, using the anhydrous ligand, produces a product with different handling and selectivity characteristics.

D. A polymer preparation analogous to that of part A above was carried out using a 1% crosslinked chloromethylated polystyrene containing 23.4% chlorine (6.75 mmoles per gram) and appropriate molar equivalents of ligand monohydrate (1) and other reagents. The yield was 5.47 g and the polymer contained 7.8% nitrogen, corresponding to 1.85 mmoles of ligand per gram of polymer.

EXAMPLE 17

1% crosslinked Polystyrene with Hydrated Ligand 2

A. The reaction between 2.0 g of 1% crosslinked chloromethylated polystyrene, 5.15 g of ligand (2), 243 1 of water and 0.75 g of sodium methoxide in 50 ml of DMF was carried out as described in Example 16, part D above.

Product yield was 5.35 g and the nitrogen content was 10.4% corresponding to 1.86 mmoles of ligand per gram of polymer.

B. The reaction of part A immediately above was repeated but without added water. The polymer yield was 5.63 g and the nitrogen content was 10.8% corresponding to 1.93 mmoles of ligand per gram of polymer.

EXAMPLE 18

Chloromethylated Polystyrene, 1% Crosslinked, 200–400 Mesh Beads

A commercial sample* of 1% crosslinked polystyrene, 200–400 mesh beads, was chloromethylated to obtain an 89% yield of product.

* Bio-Rad Laboratories, Richmond, Calif.

Anal. Found: Cl, 20.5, 20.7% equivalent to 5.8 mgatom per gram

EXAMPLE 19

Polymer-Ligand 4 Prepared in Anhydrous Medium

A 2.0 g portion of chloromethylpolystyrene (Example 18) was treated with molar equivalents of ligand 4 and sodium methoxide in DMF as previously described. The yield of product was 5.3 g (83%).

Anal. Found: N, 7.5%, equivalent to 1.79 mmoles of ligand per gram of polymer.

EXAMPLE 20

Polymer-Ligand 4 Prepared in Hydrous Medium

The reaction above was repeated, but one molar equivalent of water was added to the reaction mixture. The product weighed 5.2 g (80%).

Anal. Found: N, 7.4% equivalent to 1.76 mmoles of ligand per gram.

EXAMPLE 21

Polymer-Ligand 6 Prepared in Anhydrous Medium

A 2.00 g portion of chloromethylpolystyrene (Example 18) was treated with ligand 6 and sodium methoxide in anhydrous DMF as described previously to obtain 5.65 g (91%) of polymer. Anal. Found: N, 7.5, 7.8% equivalent to 1.82 mmoles of ligand per gram.

EXAMPLE 22

Polymer-Ligand 6 Prepared in Hydrous Medium

The above experiment was repeated but with one molar equivalent of water in the reaction mixture. Product yield was 5.16 g (79%). Anal. Found: 7.7, 7.9% equivalent to 1.86 mmoles of ligand per gram.

EXAMPLE 23

Polymer-Ligand 1 Prepared in Anhydrous Medium

The reaction of 2.00 g of chloromethylpolystyrene (Example 18) with anhydrous ligand 1 was carried out as previously described. The yield of polymer was 4.03 g (51%). Anal. Found: N, 6.56% equivalent to 1.56 mmoles of ligand per gram.

EXAMPLE 24

Polymer-Ligand 1 Prepared in Hydrous Medium

The reaction in Example 23 above was repeated with hydrated ligand 1 to obtain 5.65 g (91%) of product. Anal. Found: 7.4, 7.1% equivalent to 1.73 mmoles of ligand per gram.

EXAMPLE 25

Polymer-Ligand 2

The reaction of 2.00 of chloromethylpolystyrene (Example 18) with ligand 2 in anhydrous DMF gave 5.12 g (78% yield) of polymer. Anal. Found: N, 10.15% equivalent to 1.82 mmoles of ligand per gram.

EXAMPLE 26

Polymer-Ligand 9

To a solution of 4.6 g (11.6 mmoles) of compound 9 and 0.63 g (11 mmoles) of sodium methoxide in 50 ml of anhydrous dimethylformamide (DMF) was added 2.0 g of chloromethylpolystyrene (Example 18). The mixture was stirred and heated at 85°–90°C. for 12 hrs. the product was collected, washed and dried as previously described. The yield was 5.34 g (80%). Anal. Found: N, 9.0, 10.1% equivalent to 1.79 mmoles of ligand per gram.

EXAMPLE 27

A reaction analogous to the previous polymer preparations was carried out with 2.00 g of chloromethylpolystyrene beads and molar equivalents of sodium methoxide and ligand 12 to obtain 5.4 g (81% yield) of polymer. Anal. Found N, 9.5, 9.6.

The nitrogen content was eqivalent to 1.71 mmoles of ligand per gram of polymer.

EXAMPLE 28

Polymer-Ligand 15

A mixture of 3.7 g of ligand 15, 0.47 g of sodium methoxide and 1.50 g of chloromethylpolystyrene in 50 ml of anhydrous dimethylformamide was treated as previously described to obtain 3.48 g of product (59% yield). Anal. Found: N, 8.8, 8.4% equivalent 1.53 mmoles of ligand per gram.

EXAMPLE 29

Polymer-Ligand 17

A mixture of 3.3 g of ligand 17, 0.44 g of sodium methoxide and 1.38 g of chloromethylpolystyrene in 50 ml of dimethylformamide was treated as previously described to obtain 2.96 g of polymer (52%). Anal. Found: N, 8.5, 8.6% equivalent to 1.53 mmoles of ligand per gram.

EXAMPLE 30

Polymer-Ligand 19

A mixture of 4.75 g of ligand 19, 2.0 g of chloromethylpolystyrene and 0.63 g of sodium methoxide in 50 ml of dimethylformamide was treated as previously described to obtain 4.80 g (65%) of product polymer. Anal. Found: N, 8.7, 8.5 equivalent to 1.54 mmoles of ligand per gram.

As previously noted the polymer-ligand compositions are useful in the recovery of metal ions. In a manner similar to that employed in conventional ion exchange, the chelating polymer-ligand compositions of the invention in the form of particulate solid (beads or powder) is placed in a column and activated by equilibration with 15% sulfuric acid. The concentrated acid is then displaced by washing with 0.01N sulfuric acid. The dilute cupric ($Cu^{++}$) solution (concentration 50–5000 ppm Cu) containing other ions (e.g. ferric ($Fe^{3+}$)) is then passed through the column. In the case of the polymer-ligands of Example 16(C) and 16(D), saturation of the chelating sites is observed as a dark green, almost black, band advancing along the column. When all the polymer is saturated, the ion solution application is stopped and the column is washed with water; the wash and initial effluent are discarded. The metal ions are then stripped from the column with three to five column volumes of 15% sulfuric acid. Acid concentrations in the range 5–25% may be employed. Similarly, other strong mineral acids of equivalent concentration may be used. The acidic extract containing the desired copper and/or silver ions is now suitable for electrolytic recovery.

For continuous operation the ligands are chemically attached to an endless belt such as described hereinbefore which passes sequentially and continuously through the mine liquor (ion solution), appropriate wash baths, and finally a stripping acid bath.

The following examples illustrate the recovery of various ions such as copper and silver.

EXAMPLES 31–36

One gram of polymer-ligand made as described in Example 16(A) was added to 10 ml of 15% sulfuric acid in a small chromatographic column and that acid displaced by topwashing with 50 ml of 0.01N sulfuric acid (dropwise). A mixture of 25 ml each of 0.05N $Cu^{++}$ and 0.05N $Fe^{3+}$ in the form of sulfates, pH 2, was passed through the column and uncoordinated interstitial ions were washed out with 25 ml of distilled water. Coordinated ions were stripped out by washing with 25 ml of 15% sulfuric acid and the eluate diluted to 100 ml volume with 15% sulfuric acid prior to metal ion analysis. The column was again equilibrated with 0.01N sulfuric acid and another ion application, stripping cycle carried out. After five such $Cu^{++}$—$Fe^{3+}$ runs, a mixture of 25 ml each of 0.95N $Cu^{++}$, $Co^{++}$, $Ni^{++}$ and $Ag^+$ was applied and stripped. Metal ion analyses of the acidic extracts are summarized in Table I.

TABLE I

| Example No. | Ion Concentration in ppm (100 ml Solution) | | | | | $Cu^{++}/Fe^{3+}$ Ratio |
|---|---|---|---|---|---|---|
| | $Cu^{++}$ | $Fe^{3+}$ | $Co^{3+}$ | $Ni^{++}$ | $Ag^+$ | |
| 31 | 250 | 1.0 | | | | 250 |
| 32 | 187 | 0.4 | | | | 467 |
| 33 | 253 | 0.2 | | | | 1265 |
| 34 | 177 | 1.1 | | | | 161 |
| 35 | 147 | 0.75 | | | | 196 |
| 36 | 103 | | 0.2 | 0.2 | 240 | |

From these data the metal ion coodinating capacity of the polymer in mg metal/g of polymer is conveniently calculated by multiplying the solution ion concentration in ppm (parts per million) by 0.1. Thus, from Table I the $Cu^{++}$ capacity of the polymer varies from about 10–25 mg $Cu^{++}$/g and the Ag capacity at least 24 mg/g depending upon the mode of application of the original ion mixture.

EXAMPLES 37–39

A 2.0 g-portion of polymer-ligand (1) of Example 16(B) was used for metal ion scavenging as described under Examples 31–36. Results are summarized in Table II and are normalized to a 1.0 g basis to simplify capacity calculation. Examples 37 and 38 were with the original solutions containing only $Cu^{++}$ and $Fe^{3+}$ and Example 39 with solution containing also $Co^{++}$, $Ni^{++}$ and $Ag^+$.

TABLE II

| Example No. | Ion Concentration in ppm (100 ml Solution) | | | | | $Cu^{++}/Fe^{3+}$ Ratio |
|---|---|---|---|---|---|---|
| | $Cu^{++}$ | $Fe^{3+}$ | $Co^{++}$ | $Ni^{++}$ | $Ag^+$ | |
| 37 | 213 | 0.6 | | | | 370 |
| 38 | 384 | 2.5 | | | | 153 |
| 39 | 143 | 0.2 | 0.3 | 0.5 | 222 | 715 |

EXAMPLES 40–43

A 2 g-portion of polymer ligand (1) from Example 16(C) was used for metal ion scavenging as described above. The results are summarized in Table III, again normalized to 1 g of polymer.

TABLE III

| Example No. | Ion Concentration in ppm (100 ml Solution) | | | | | $Cu^{++}/Fe^{3+}$ Ratio |
|---|---|---|---|---|---|---|
| | $Cu^{++}$ | $Fe^{3+}$ | $Co^{++}$ | $Ni^{++}$ | $Ag^+$ | |
| 40 | 58.5 | 0.7 | | | | 84 |
| 41 | 87.5 | 1.0 | | | | 88 |
| 42 | 110 | | | | 305 | |
| 43 | 70 | 0.38 | 0.35 | 0.55 | 208 | 184 |

EXAMPLE 44

Ion scavenging experiments with polymerligand (1) from Example 16(D) were carried out through 17 cycles with $Cu^{++}$—$Fe^{3+}$ (or $Fe^{++}$) mixtures. The average capacity was 48 ± 3 mg $Cu^{++}$/g of polymer and the average $Cu^{++}/Fe^{3+}$ selectivity ratio was about 2000. The lower degree of crosslinking of the chloromethylated polystyrene (1%) in this polymer-ligand vs. the higher 2% crosslinking in the polymer-ligand of Example 16(A), (B), and C had a noticeable effect on the $Cu^{++}$ capacity and selectivity. The capacity was increased and the $Cu^{++}$ selectivity magnified. With a $Cu^{++}$—$Ag^+$ mixture, the capacity was 37 mg $Cu^{++}$/g and 28 mg $Ag^+$/g.

EXAMPLE 45

The polymer-ligand (1) of Example 44 was used for $Cu^{++}$ recovery from an actual sample of mine water obtained from the Rio Tinto mine, Mountain City, Nev. A 150-ml portion of mine water passed through the activated polymer (2.0 g), the polymer washed with 25 ml of distilled water and then stripped with 15% sulfuric acid (25 ml) to obtain the complexed metal ion extract which was diluted to 100 ml for ion analyses. The results are summarized in Table IV.

TABLE IV

| Solution Description | Ion Content ppm | |
|---|---|---|
| | $Cu^{++}$ | $Fe^{3+}$ |
| Original mine water | 66 | 7.3 |
| Eluate after passing through column | 0.6 | 7.0 |
| Acid extract | 95 | 0.1 |

The polymer-ligand virtually completely removed the $Cu^{++}$ to the almost complete exclusion of $Fe^{3+}$.

EXAMPLE 46

Ion scavenging tests with polymer-ligand (2) were carried out for $Cu^{++}$—$Fe^{3+}$ complexation (pH=2) as described in Examples 31–36. The polymer-ligand(2) had a $Cu^{++}$ capacity of 107 mg $Cu^{++}$/g and snowed a $Cu^{++}/Fe^{3+}$ binding ratio of 850. With $Cu^{++}$—$Ag^+$ mixtures at pH 2, the capacities were 106 mg $Cu^{++}$/g and 7 mg $Ag^+$/g.

To determine if this polymer-ligand was suitable for removing copper from highly acid media, a solution of $CuSO_4$ in 3% nitric acid was prepared and 200 ml was passed through the column and solutions analyzed for $Cu^{++}$. The results are summarized in Table V.

TABLE V

| Solution Description | |
|---|---|
| Original solution | 138 |
| Eluate after passing through column (200 ml) | 0.5 |
| Acid extract (200 ml) | 137 |

The polymer-ligand (2) virtually quantitatively removed $Cu^{++}$ from 3% nitric acid.

EXAMPLES 47–49

The polymer-ligand (2) compositions from Examples 17(A) and 17(B) were used to recover ions from mixtures (pH=2), the amount of each ion applied being sufficient to theoretically saturate the polymer. Results for one gram of polymer are summarized in Table VI.

TABLE VI

| Example No. | Polymer-ligand of | Ions Applied | Recovered Ion concentrations in ppm (100 ml solution) | | | | |
|---|---|---|---|---|---|---|---|
| | | | $Cu^{++}$ | Iron | $Co^{++}$ | $Ni^{++}$ | $Ag^+$ |
| 47 | Ex. 18-A | $Co^{++}$, $Ni^{++}$ | | | 5 | 670 | |
| 48 | Ex. 18-A | $Cu^{++}Fe^{++}$, $Fe^{+++}$, $Co^{++}$, $Ni^{++}$, $Ag^+$ | 500 | 0.4 | 0.3 | 280 | 25 |
| 49 | Ex. 18-B | $Cu^{++}$, $Ni^{++}$ | 660 | | | 240 | |

From the above table it can be seen that the tetradentate polymer-ligands are very effective in selectively recovering copper and nickel ions from mixtures with other ions. Silver, albeit to a lesser extent, is also recovered.

EXAMPLES 50–61

Solutions 0.5 M in metal ion or 0.05 M in each of several ions as sulfates in 0.01 N $H_2SO_4$ were applied to the polymers in amount equivalent to 1½ times that of the theoretical capacity of each polymer. The polymer columns were then washed with water and chelated ions were stripped with 15% $H_2SO_4$. The strip solutions were diluted with 15% $H_2SO_4$ to total volume of 100 ml and analyzed for metal ions by atomic absorption. The results are geive in Table VII.

The ion solutions (Fe column) were equimolar mixtures of both valences Fe(II) and Fe(III) and each value represents an average of analyses on three separate solutions; average deviations were about ± 3–5%.

TABLE VII

| Ex. | Polymer-Ligand According to Ex. No. | Ligand Structure | Theoretical Capacity Expressed as mmoles of ligand per gm of polymer | Capacity Found, mmoles/g (1) |  |  |  |  |
|---|---|---|---|---|---|---|---|---|
|  |  |  |  | Fe | Co(II) | Ni(II) | Cu(II) | Ag(II) |
| 50 | 19 | (structure) | 1.79 | 0.002 |  |  | 0.39 |  |
|  |  |  |  |  |  |  |  | 0.57 |
|  |  |  |  | 0.001 | 0.001 | 0.001 | 0.13 | 0.32 |
| 51 | 20 | ditto | 1.76 | 0.001 |  |  | 0.38 |  |
|  |  |  |  |  |  |  |  | 0.53 |
|  |  |  |  | 0.001 | 0.001 | 0.001 | 0.31 | 0.12 |
| 52 | 21 | (structure) | 1.82 | 0.002 |  |  | 0.69 |  |
|  |  |  |  |  |  |  |  | 0.67 |
|  |  |  |  | 0.004 | 0.01 | 0.003 | 0.51 | 0.18 |
| 53 | 22 | ditto | 1.86 | 0.001 |  |  | 0.76 |  |
|  |  |  |  |  |  |  |  | 0.69 |
|  |  |  |  | 0.003 | 0.0004 | 0.002 | 0.56 | 0.17 |
| 54 | 23 | (structure) | 1.57 | 0.006 |  |  | 0.03 |  |
|  |  |  |  |  |  |  |  | 0.52 |
|  |  |  |  | 0.03 | 0.003 | 0.006 | 0.15 | 0.21 |
| 55 | 24 | ditto | 1.73 | 0.004 |  |  | 0.75 |  |
|  |  |  |  |  |  |  |  | 0.60 |
|  |  |  |  | 0.004 | 0.0004 | 0.003 | 0.55 | 0.17 |
| 56 | 25 | (structure) | 1.82 | 0.007 |  | 1.15 | 1.70 |  |
|  |  |  |  |  |  | 0.44 | 1.06 |  |
|  |  |  |  |  |  |  |  | 1.32 |
|  |  |  |  | 0.004 | 0.002 | 0.48 | 1.16 | 0.03 |

TABLE VII (continued)

| Ex. | Polymer-Ligand According to Ex: No. | Ligand Structure | Theoretical Capacity expressed as mmoles of ligand per gm of polymer | Capacity Found, mmoles/g (1) | | | | |
|---|---|---|---|---|---|---|---|---|
| | | | | Fe | Co(II) | Ni(II) | Cu(II) | Ag(II) |
| 57 | 26 | (structure) | 1.79 | 0.002 | 0.50 | 0.03 | 1.62 1.38 | 1.42 |
| | | | | 0.003 | 0.0003 | 0.23 | 1.26 | 0.30 |
| 58 | 27 | (structure) | 1.71 | 0.001 | 0.25 | 0.03 | 1.11 1.15 | 1.31 |
| | | | | 0.003 | 0.0002 | 0.004 | 0.89 | 0.34 |
| 59 | 28 | (structure) | 1.53 | 0.002 | 0.06 | .002 | 0.98 1.00 | 1.30 |
| | | | | 0.002 | 0.002 | 0.002 | 0.61 | 0.43 |
| 60 | 29 | (structure) | 1.53 | 0.008 | 0.50 | 0.08 | 1.14 1.12 | 1.13 |
| | | | | 0.008 | 0.002 | 0.09 | 0.01 | 0.13 |
| 61 | 30 | (structure) | 1.54 | 0.005 | | | 0.06 1.58 | |
| | | | | 0.003 | 0.001 | 0.03 | 0.07 | 1.20 |

(1) Analyses for more than one metal ion in any given row means that a mixture of ions was applied, thus chelation is competitive and the results measure the selectivity of chelation among various ions. A single value in any given row measures the absolute capacity of the resin for that particular ion.

The results in Table VII show that the tridentate polymer-ligands of Examples 50–55 are suitable for separating Cu(II) from Fe(II) and Fe(III) or isolating concentrates enriched in Cu(II) or Ag(I) or both.

The tetradentate polymer-ligands of Examples 56–61 permit separation of Cu(II) from Fe(II) and Fe(III). The composition of Example 56 also permits isolation of concentrates of Cu(II) and Ni(II) to the exclusion even of Ag(1). Appropriate substitution such as in Example 58 permits isolation of Cu(II) and Ag(I) concentrates.

Use of different polymers in series permits separation of each of the ions Ni(II), Cu(II) and Ag(I) individually.

The embodiment of the invention in which an exclusive property or privilege is claimed are defined as follows:

1. A polymer-ligand comprising a high molecular weight water insoluble polymer containing about 0.3 to about 2 millimoles of a covalently bonded ligand per gram of polymer, the ligand having the formula

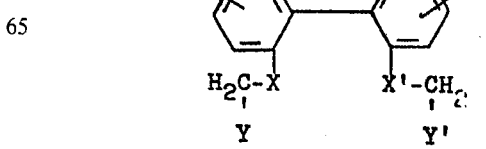

wherein
R is H or alkyl of 1–3 carbon atoms;
X and X' independently are NH, O or S;
Y is

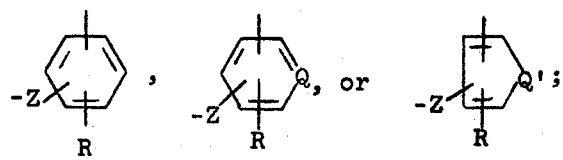

and
Y' is

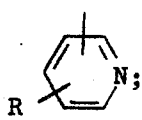

in which
Z is —O—, —S—, —S(CH$_2$)$_n$—, —O(CH$_2$)$_n$—, —NH—, or —NH(CH$_2$)$_n$— where $n = 1$ to 10;
Q is N; and
Q' is NH, O, or S;
with the proviso that at least three of X, X', Q and Q' are nitrogen;
said ligand being attached to the methylene carbon by the indicated valence bond and attached to the polymer through the Z group.

2. A polymer-ligand according to claim 1 in which the said indicated valence bond is ortho to the Q or Q' atom.

3. A polymer-ligand according to claim 1 in which X and X' are each N.

4. A polymer-ligand according to claim 1 in which the polymer is polystyrene.

5. A polymer-ligand according to claim 1 in which the polymer is crosslinked polystyrene.

6. A polymer-ligand according to claim 1 in which the ligand has the formula

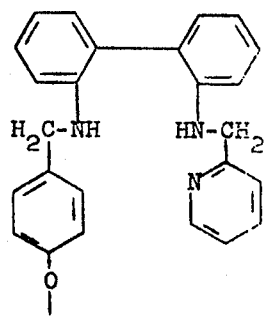

7. A polymer-ligand according to claim 1 in which the ligand has the formula

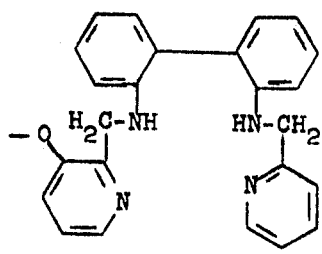

8. A polymer-ligand according to claim 1 in which the ligand has the formula

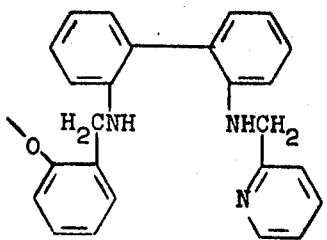

9. A polymer-ligand according to claim 1 in which the ligand has the formula

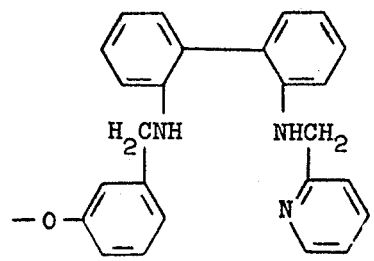

10. A polymer-ligand according to claim 1 in which the ligand has the formula

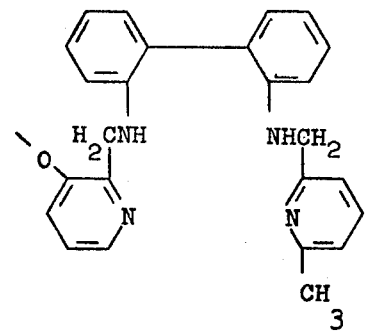

11. A polymer-ligand according to claim 1 in which the ligand has the formula

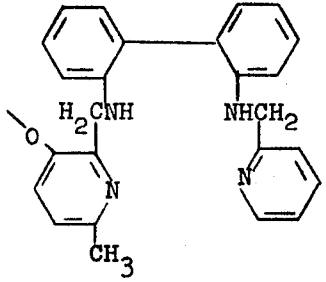

12. A polymer-ligand according to claim 1 in which the ligand has the formula

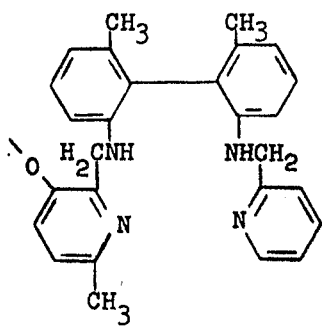

13. A polymer-ligand according to claim 1 in which the ligand has the formula

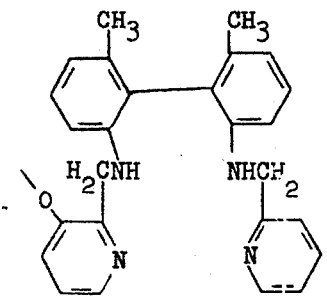

14. A polymer-ligand according to claim 1 in which the ligand has the formula

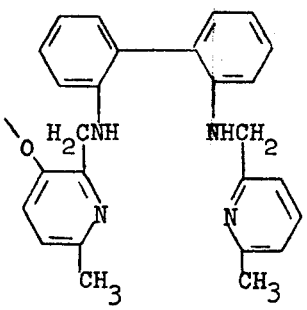

15. The process of removing cupric or argentous ions from their aqueous solution which also contains other metal ions, which comprises contacting said aqueous solution with a polymer-ligand according to claim 1 to selectively bind cupric or argentous ions to the polymer-ligand, removing the polymer-ligand containing the bound ions, and recovering the ions from the polymer-ligand.

16. The process of claim 15 in which sulfuric acid of 1–25% strength is used to recover the ions from the polymer-ligand.

* * * * *

UNITED STATES PATENT OFFICE
CERTIFICATE OF CORRECTION

PATENT NO. : 3,873,668
DATED : March 25, 1975
INVENTOR(S) : Lester Russell Melby It is certified that error appears in the above-identified patent and that said Letters Patent are hereby corrected as shown below:

Col. 27, line 28 - after "said" insert -- Y group of the --.

Signed and sealed this 24th day of June 1975.

(SEAL)
Attest:

RUTH C. MASON
Attesting Officer

C. MARSHALL DANN
Commissioner of Patents
and Trademarks